Nov. 29, 1955  W. A. AYRES  2,724,974
BELT DRIVE
Filed Sept. 18, 1951  2 Sheets-Sheet 1
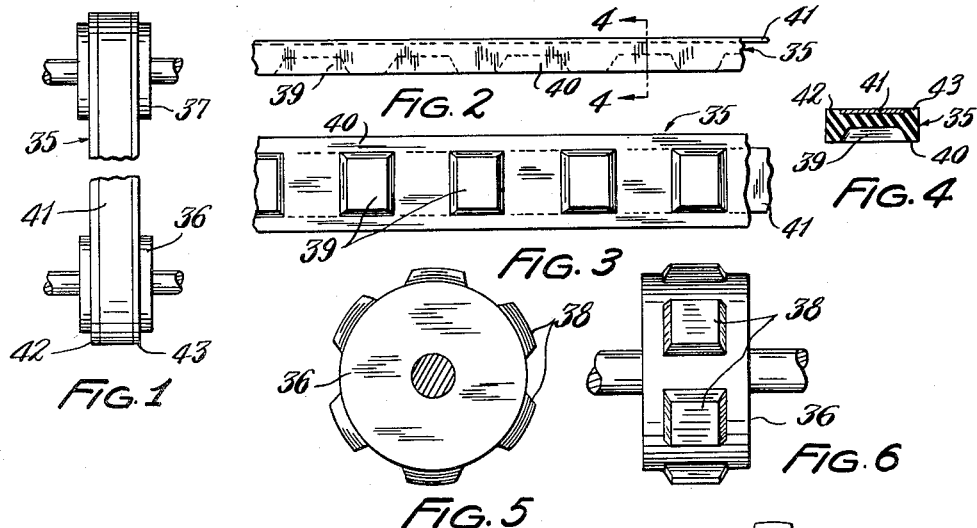
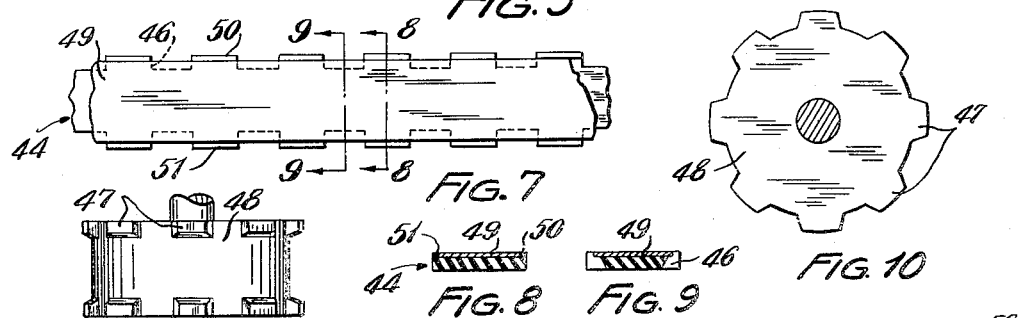
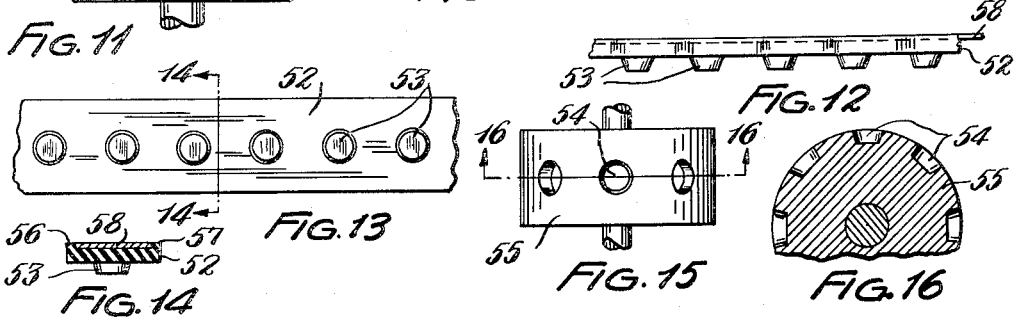
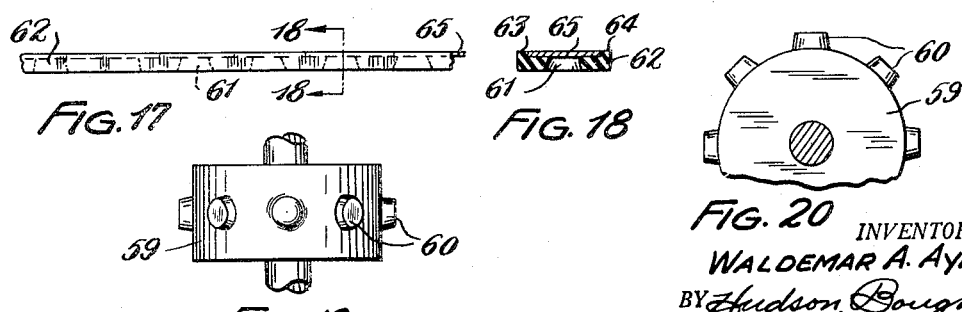
INVENTOR.
WALDEMAR A. AYRES
BY Hudson, Boughton,
Williams, David & Hoffmann
ATTORNEYS Nov. 29, 1955  W. A. AYRES  2,724,974
BELT DRIVE
Filed Sept. 18, 1951  2 Sheets-Sheet 2
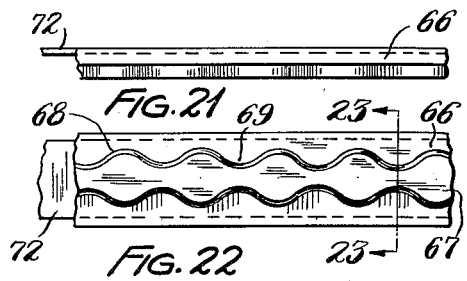
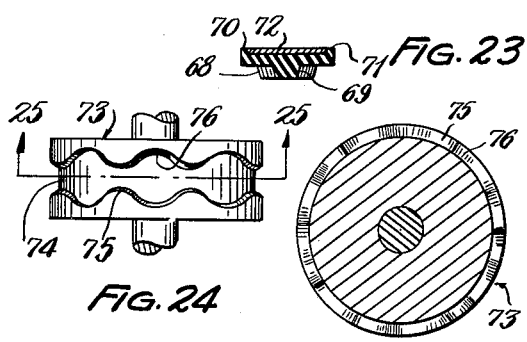
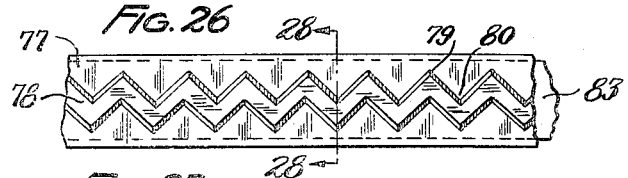
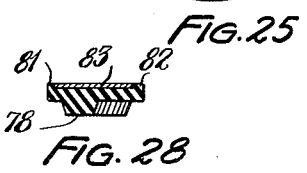
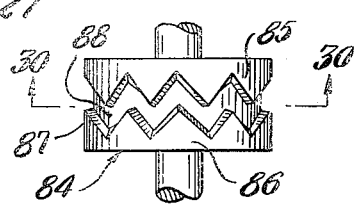
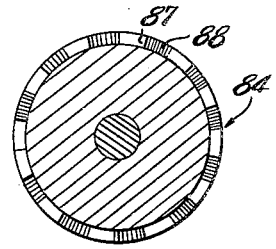
INVENTOR.
WALDEMAR A. AYRES
BY Hudson, Boughton,
Williams, David & Hoffmann.
ATTORNEYS

# United States Patent Office 2,724,974
Patented Nov. 29, 1955

2,724,974

BELT DRIVE

Waldemar A. Ayres, Lakewood, Ohio, assignor to White Sewing Machine Corporation, Cleveland, Ohio, a corporation of Delaware Application September 18, 1951, Serial No. 247,103

2 Claims. (74—229)

This invention relates to belt drives and, more particularly, to improved driving belt and pulley constructions for transmitting motion between driving and driven members without slippage therebetween.

There is at the present time a considerable demand for inexpensive motion transmitting means in the form of a belt drive for use in mechanisms where the power transmitted is relatively low and the speeds are relatively high and where the relative positions of the moving parts must be maintained in predetermined relationship. A sewing machine may be mentioned as representing one such mechanism where a drive of this type would be advantageous, for example, between the needle bar operating shaft and the hook or bobbin shaft, since these parts must be operated in exactly predetermined timed relationship and at relatively high speeds, while the force transmitted through the drive is comparatively small. A number of other mechanisms present similar problems and hence, while the drives hereinafter described are well suited for use in sewing machines, they are not limited thereto.

One attempt to provide a suitable belt type drive which will maintain timed relationship between the rotatable members of the drive has taken the form of a rubber or composition belt having teeth which cooperate with corresponding teeth on the pulleys of the drive. Such a drive is satisfactory only where no appreciable load is imposed thereon due to the tendency of the belt to elongate under load. In an effort to overcome such elongation and preserve the proper timed relationship of the rotatable members and of the drive belt, a belt has been devised in which fabric or metal members are imbedded in the belt at the time of manufacture. Such belts, while satisfactory with respect to substantially no elongation under ordinary loads, are relatively expensive and, moreover, present installation problems where the cooperating gears or pulleys cannot be readily removed or adjusted since the belts cannot be elongated in placing them over the teeth of the gears.

An object of this invention is, therefore, to provide an improved drive of the belt and pulley type for transmitting motion from one rotatable member to the other in exact timed relationship, the drive having the flexibility and ease of installation of conventional belt drives employing a stretchable belt, while at the same time having the accuracy of a gear train when the members of the drive are assembled in driving relationship.

Another object of the invention is to provide an improved drive for transmitting motion from one member to another without slippage therebetween, the drive being characterized by its low cost, ease of manufacture, and its quietness and accuracy of operation.

A further object of the invention is to provide an improved drive of the belt and pulley type in which the belt member is an endless band of resilient material with an endless non-extensible strain resisting member extending circumferentially about said band in contact with the outer surface thereof, the pulley and belt members having complementarily shaped driving surfaces cooperating in the manner of teeth to effect driving relationship therebetween without slippage.

A still further object of the invention is to provide an improved drive of the type mentioned in the preceding paragraph and wherein a means is provided to prevent displacement of the strain resisting member laterally with respect to the said band.

An additional object of the invention is to provide an improved drive belt in the form of an endless band of resilient material with driving surfaces extending transversely relative to the thickness of the band and adapted to mesh with complementarily shaped surfaces on a rotatable member about which the belt is trained, the said belt being extensible for ease in placing it in cooperation with an associated rotatable member and thereafter being prevented from elongating by virtue of a removable non-extensible strain resisting member placed circumferentially thereabout in contact with the outer surface thereof.

Another object of the invention is to provide a drive belt of the type defined in the preceding paragraph and wherein the resilient band has a means on the outer surface thereof for preventing displacement of the non-extensible member laterally relative to the band.

The invention also has as an object thereof the provision of an improved drive belt and cooperating rotatable member as defined above so constructed and arranged that lateral displacement of the belt relative to the rotatable members is prevented.

The invention further resides in detailed features of the construction of the belts and cooperating rotatable members, and further objects and advantages of the invention will be apparent to those skilled in the art to which it pertains from the following description of the present preferred embodiment, and certain modifications thereof, described with reference to the accompanying drawings, in which identical parts in the several views are designated by the same reference characters, and in which:

Fig. 1 is an elevational view of the present preferred embodiment of the novel belt drive;

Fig. 2 is an enlarged fragmentary side elevational view of the drive belt shown in Fig. 1;

Fig. 3 is a fragmentary bottom view of the drive belt shown in Fig. 2;

Fig. 4 is a transverse sectional view taken substantially on the line 4—4 of Fig. 2;

Fig. 5 is a side elevational view of one of the rotatable members or pulleys shown in Fig. 1, the view being to an enlarged scale with respect to Fig. 1;

Fig. 6 is an end view of the pulley shown in Fig. 5;

Fig. 7 is a fragmentary top plan view of a modified form of drive belt embodying the principles of this invention;

Fig. 8 is a transverse sectional view taken substantially on the line 8—8 of Fig. 7;

Fig. 9 is a transverse sectional view taken substantially on the line 9—9 of Fig. 7;

Fig. 10 is a side elevational view of a rotatable member or pulley of the type adapted to cooperate with the drive belt shown in Figs. 7 to 9;

Fig. 11 is a plan view of the rotatable member or pulley shown in Fig. 10;

Fig. 12 is a fragmentary side elevational view of another form of drive belt constructed in accordance with this invention;

Fig. 13 is a bottom view of a portion of the belt shown in Fig. 12;

Fig. 14 is a transverse sectional view taken substantially on the line 14—14 of Fig. 13;

Fig. 15 is a plan view of a rotatable member or pulley adapted to cooperate with the belt shown in Figs. 12 and 13;

Fig. 16 is a fragmentary sectional view taken substantially on the line 16—16 of Fig. 15;

Fig. 17 is the fragmentary side elevational view of a still different form of drive belt constructed in accordance with this invention;

Fig. 18 is a transverse sectional view taken substantially on line 18—18 of Fig. 17;

Fig. 19 is a top plan view of a rotatable member or pulley adapted to cooperate with a belt of the type shown in Figs. 17 and 18;

Fig. 20 is a fragmentary side elevational view of the rotatable member or pulley shown in Fig. 19;

Fig. 21 is a fragmentary side elevational view of a still different form of drive belt embodying the principles of the invention;

Fig. 22 is a fragmentary bottom view of the belt shown in Fig. 21;

Fig. 23 is a transverse sectional view taken substantially on the line 23—23 of Fig. 22;

Fig. 24 is a top plan view of a rotatable member or pulley adapted to cooperate with a belt of the type illustrated in Figs. 21 to 23;

Fig. 25 is a sectional view taken substantially on the line 25—25 of Fig. 24;

Fig. 26 is a fragmentary side elevational view of a still different form of drive belt embodying the invention;

Fig. 27 is a fragmentary bottom view of the drive belt shown in Fig. 26;

Fig. 28 is a transverse sectional view taken substantially on the line 28—28 of Fig. 27;

Fig. 29 is a top plan view of a rotatable member or pulley adapted to cooperate with the drive belt illustrated in Figs. 26 to 28; and Fig. 30 is a sectional view taken substantially on the line 30—30 of Fig. 29.

Referring first to Figs. 1 to 6 of the drawings, it will be seen that the novel drive forming the subject of this invention is embodied in the form of an endless flexible band 35, preferably formed of resilient material, such as natural or synthetic rubber, synthetic resins such as polyethylene, or other materials of similar characteristics, which will enable the band to be stretched slightly while being placed in or removed from driving relationship with respect to rotatable members or pulleys 36, 37. This driving relationship is positive and non-slipping by virtue of the band 35 and the pulleys 36, 37 being provided with equally spaced, cooperating driving surfaces extending transversely relative to the thickness of the band. In the embodiment shown in Figs. 1 to 6, these driving surfaces are in the form of projections such as 38 upon the pulleys, which projections are substantially rectangular in cross section and cooperate with correspondingly shaped recesses or openings 39 extending from the inner surface of the band 36 inwardly of the material thereof. The projections 38 are of lesser width than the width of the rotatable member such as 36 on which they are formed while the recesses 39 in the band 35 have integral side walls or flange portions 40 cooperating with the side walls of the projections 38, thus preventing lateral displacement of the band relative to the rotatable members or pulleys. The flanks of the projections and recesses may be substantially straight or may be slightly tapered, as shown, to facilitate meshing. Also, it will be apparent that the shapes of the projections and recesses may be other than those shown so long as they are complementary.

The projections 38 may be provided upon the rotatable members or pulleys, such as 36, 37, in any desired manner, either by forming them integrally thereon or by providing the said projections as separate elements which are thereafter secured to the periphery of the rotatable member or pulley. Without limitation thereto, it may be stated that one convenient mode of forming such pulleys is to provide a blank having a diameter equal to or greater than that across the projections 38 and then turning the portions of the blank adjacent the side faces to the diameter of the member at the base of the projections 38, the said projections being thereafter provided by transverse milling or otherwise removing the material at spaced points about the remaining circumferential flange or ridge.

The construction of the band 35 of resilient material enables the latter to be stretched slightly and thus facilitates placing it in cooperating relationship with the pulleys or rotatable members such as 36, 37. Such a band, without more, however, would not effect accurate timed relationship rotation of the pulleys or members 36, 37, especially if any load were applied thereto, since the material of the band 35 would elongate, thus permitting rotative movement of one of the rotatable members relative to the other member. In order to prevent this extension or elongation of the band, the latter is provided with an endless flexible non-extensible strain resisting member 41, which in the illustrated embodiment is in the form of an endless ribbon-like band of thin metal, and which is placed about the outer circumference of the band 35 in intimate contact therewith but separable therefrom. In order to prevent lateral displacement of the member 41 relative to the band 35 during normal use, the band 35 is preferably provided with a means for retaining the strain resisting member 41 thereon and as shown in the drawings this means is in the form of spaced flanges 42 and 43, integral with the outer surface of the band 35 and extending along the side edges thereof with the strain resisting member received therebetween.

The strain resisting member 41 may be formed from thin gauge steel, Phosphor-bronze or other suitable metal. The member 41 is preferably formed by severing a strip of the metal in a width corresponding with the width between the flanges 42, 43 of the resilient band 35 and of a length equal to or slightly greater than the periphery of the portion of the band 35 intermediate the flanges 42, 43. The ends of the said strip of metal are then secured together by welding, brazing, soldering, or the like so that the circumferential length of the completed band 41 is substantially equal to the peripheral dimension of the band 35, intermediate the flanges 42, 43, when the said band 35 is not elongated.

As mentioned heretofore, the resiliency of the band 35 facilitates application of the band 35 to and removal of it from the pulleys or rotatable members 36, 37 and this resiliency also enables application of the strain resisting member 41 after the band 35 is in place, since the flanges 42, 43 and adjacent portions of the band 35 can be caused to yield sufficiently to permit slipping of the member 41 thereon into the position shown in Fig. 1. Conversely, the metal band 41 may be first applied to the band 35 and the assembled band then applied to the rotatable members or pulleys 36, 37 when one of the latter is adjustably or removably mounted.

Figs. 7 through 11 illustrate a somewhat different form of the invention which, however, embodies the principles described above in conjunction with Figs. 1 to 6. The form of the device illustrated in Figs. 7 to 9 employs a drive belt comprising a resilient band 44 which has driving surfaces 46 formed therein transversely of the thickness thereof for cooperation with complementarily shaped driving surfaces 47 upon associated rototable members or pulleys 48, one only of which is here shown. In this form of the invention, however, the driving surfaces 46 in the band 44 are formed by providing spaced laterally extending notches or recesses in the side edges of the band 44 while the driving surfaces 47 on the pulleys 48 are spaced radially extending projections in two spaced circumferentially extending series, one adjacent either side face of the pulley, see Fig. 11.

As in the previously described embodiment, the flexible band has the outer surface thereof provided with spaced upstanding flanges between which an endless non-extensible strain resisting member 49 is provided, this member being a ribbon-like metal band which may be identical with the band 41. In the instant form of the belt, the flanges adjacent the side edges of the band 44 are not continuous, due to the formation of the driving surfaces in the side edges of the belt. Instead, these flanges, designated 50 and 51, extend only along the outer edges of the band 44 which extend laterally outwardly intermediate the recesses which form the driving surfaces 46.

A rotatable member or pulley such as 48 may be formed by providing a blank having a diameter equivalent to the distance across the completed member and inclusive of the projections 47. A central groove is then milled or otherwise machined about the circumference of the blank medially thereof, thus providing two ridges or side flanges having a height and width equal to the corresponding dimensions of the desired projections 47. Thereafter the separate projections 47 may be formed by transverse milling or otherwise removing the material at spaced points around the circumference of the flanges produced in the first machining or milling operation.

A belt of the form shown in Figs. 7 to 9 may be placed in cooperative relationship with its associated rotatable members or pulleys 48 by either of the methods mentioned above in conjunction with the form of the invention illustrated in Figs. 1 to 6. Moreover, a belt of this type will likewise transmit motion from one pulley to the other without slippage between the pulleys and belt, so that the pulleys will rotate in exact predetermined timed relationship, since the non-extensible member or band 49 prevents extension of the resilient band 44.

The belt illustrated in Fig. 7 has the ribbon-like metallic member 49 extending over a portion of the recess into which the projections 47 of the pulleys extend. This is desirable to prevent flexing of the teeth-like laterally projecting portions of the belt relative to the main body thereof. The portion of the metal band 48 thus extending over a portion of the projections 47 may either contact the outer surfaces of these projections or, if desired, the thickness of the resilient member 44 may be made sufficient so that the metallic member 49 is held spaced from the outer ends of the projections 47.

The form of the novel belt drive illustrated in Figs. 12 to 16 has the cooperating driving surfaces upon the belt and pulleys in the form of pin-like projections cooperating with spaced similarly shaped recesses or holes. Thus, the resilient band 52 of the belt member has the inner surface thereof provided with spaced truncated conical projections 53 which are substantially circular in cross section and have a maximum diameter substantially less than the width of the band and are adapted to interengage with correspondingly spaced, radially extending recesses or openings 54 in rotatable members or pulleys such as 55. The resilient member 52 may be formed of any suitable material, such as those mentioned in conjunction with band 35, with the projections 53 integrally molded therewith. The band 52 may be molded or otherwise constructed in endless form or may be provided in strip form and the ends thereafter secured together.

The outer surface of the band 52 is provided with spaced narrow flanges 56 and 57 extending circumferentially about the band for reception therebetween of a ribbon-like member or band 58 formed of metal and comprising an endless, non-extensible, strain resisting member identical with those designated 41 and 49 in the previously described embodiments. The pulley 55 may be formed from a cylindrical blank by simply drilling spaced radial holes therein of a diameter and spacing corresponding with those of the projections 53.

The belt shown in Figs. 12-14 may be applied to the pulleys such as 55 in a manner which will now be readily understood and will cooperate therewith to transmit rotary motion without slippage between the rotatable members and the belt and with the said rotatable members operated in exact predetermined timed relationship. Moreover, it should be noted that while the forward and rear portions of the projections 53 and of the openings 54, as measured in a circumferential direction about the pulleys, provide the driving and driven surfaces, the sides of these projections and openings function to prevent lateral displacement of the belt relative to the rotatable members or pulleys.

In the form of the invention illustrated in Figs. 17 to 19, the cooperating driving surfaces upon the belt and pulley members are also in the form of pin-like projections cooperating with equally spaced, complementarily shaped openings or recesses. In this form of the invention, however, the rotatable members or pulleys such as 59 are provided with the pin-like projections 60 while the openings or recesses 61, cooperating with these projections, are provided in the endless resilient band 62, forming a part of the belt. The pin-like projections 60 may be formed integrally with the pulleys or rotatable members 59 or separately therefrom and then suitably secured thereto. The resilient band 62 may either have the recesses or openings molded therein during the formation of the band or these may be subsequentially cut therein.

The band 62, illustrated in Figs. 17 and 18, is like the previous bands, provided on the outer surface thereof with spaced circumferentially extending flanges 63 and 64 between which an endless, non-extensible, strain resisting member, such as a metallic ribbon-like band, 65 is placed as in the previous forms of the invention. This member or band 65 performs the same functions as the bands 41, 49 and 58 and hence need not be again described. Also, as in the previous embodiments, the belt drive of the type here illustrated operates to transmit rotary motion between pulleys such as 59 in exact predetermined timed relationship and without slippage between the pulleys and the belt member with the pin-like projections 60 and the interengaging opening 61 cooperating, in the same manner as described for the projections 53 and opening 54, to prevent lateral displacement of the belt relative to the pulleys.

In Figs. 21 to 25, the invention is illustrated as embodied in a belt drive having the same characteristics of construction and operation as has been described heretofore. In this form of the invention, however, the cooperating driving surfaces are in the form of alternate recesses and projections provided both upon the rotatable members or pulleys and upon the resilient band of the belt. Thus the band 66, which is formed of resilient material and provided in the shape of an endless extensible member, has the inner circumference thereof provided with a circumferentially extending ridge 67. The side edges of this ridge have alternate laterally extending projections 68 and recesses 69 which are of curved shape, thus providing a sinuous configuration. The outer surface of the band 66 is provided, as in the previous embodiments, with upstanding circumferentially extending flanges 70 and 71 between which a separable, endless, non-extensible, strain resisting member 72 is placed and retained, this member being preferably a ribbon-like band of metal formed in the same manner as the bands 41, 49, 58 and 65 and functioning in the same manner.

The rotatable members or pulleys 73, adapted to cooperate with the band shown in Figs. 21 to 23, are provided with a circumferentially extending groove 74 with radially extending side flanges on either side thereof, the inner surfaces of which are provided with alternate axial projections 75 and recesses 76 having the same shape and spacing as the recesses and projections 69 and 68, respectively, provided on the ridge 67 of the belt so that the belt and pulley have cooperating sinuous surfaces providing tooth-like members in driving relationship when the belt is assembled with the pulleys. This form of the belt may be applied to and removed from the pulleys as has heretofore been explained and functions in the same manner to effect rotation of the pulleys in exactly predetermined timed relationship without slippage between the said pulleys and belt. Moreover, the construction of the belt and the cooperating pulleys is such that the belt is prevented from lateral displacement relative to the pulleys.

Figs. 26 to 30 illustrate a still different form of the invention which nevertheless embodies the same general principles of construction and operation as those in the previously described embodiments. In this form of the invention the belt comprises a resilient endless band 77, the inner surface of which is provided with an inwardly projecting circumferentially extending continuous ridge or rib 78 and, therefore, in this respect is similar to the band 66. In the instant form of the invention, however, the ridge or rib 78 has the side edges thereof serrated to provide a substantially herringbone or zigzag configuration. Consequently, the said side edges provide alternate projections 79 and recesses 80 which are of triangular configuration, the projections on one side edge of the ridge being opposite to complementarily shaped recesses on the other side of the ridge as will be apparent from Fig. 27. The ridge or rib 78, with its projections and recesses, may be molded in the form shown or, if desired, the rib or ridge may be separately formed and subsequently bonded to the belt. Also, the ridge and its serrations may be formed by cutting or otherwise removing material from a belt blank of suitable thickness.

The band 77 like the other bands of the belts heretofore described, is provided with spaced outwardly extending flanges 81 and 82, extending circumferentially about the outer surface of the band adjacent the side edges thereof. An endless, non-extensible, strain resisting member 83, formed from a ribbon-like band of flexible metal, is positioned between the flanges 81 and 82 in a manner which will now be apparent, this band being identical with the bands 41, 49, 58, 65 and 72 and performing the same functions.

The rotatable members or pulleys 84 which are employed with the form of the belt shown in Figs. 26 to 28, have a central circumferentially extending groove providing radially extending flange portions 85 and 86 adjacent either side edge of the pulley. The inner surfaces of these flanges have a serrated or herringbone configuration by virtue of triangularly shaped alternate projections 87 and recesses 88 formed therein and which projections and recesses are complementary to the recesses 80 and projections 79 of the band 77. It will be evident, therefore, that the band 77, when placed about pulleys or rotatable members, such as 84, will have the ridge 78 of band 77 fitted into the groove of the pulleys so that the projections and recesses on the ridge and on the pulleys cooperate to provide interengaging driving surfaces for the transmission of motion from one rotatable member or pulley to another without slippage between the belt and the pulleys. Hence, the rotation of the pulleys is in exact predetermined timed relationship since the metal ribbon or band 83 prevents extension of the band 77 under the load of stresses imposed by the driving forces. It will also be evident that the configurations of the ridge 78 and the cooperating groove of the pulleys 84 are such that lateral displacement of the belt relative to the pulleys is prevented.

It will now be apparent that, by this invention, there is provided an improved drive of the belt and pulley type which has the flexibility and other advantages of conventional belt and pulley drives while incorporating the accuracy of power or motion transmission possessed by gear or sprocket and chain drives. Moreover, the novel belt drive is capable of mass production at low cost and the belts thereof can be readily installed on and removed from the pulleys of the drive. Furthermore, while a number of different embodiments of the invention have been illustrated and described in detail, it will be evident that the invention may be embodied in still other equivalent forms. Also, although certain materials and methods of construction and assembling the parts have been specified, it will be evident that other materials and methods may be utilized without departing from the principles of the invention. Consequently, the drawings and detailed descriptions of the forms of the drive here disclosed are to be considered only as illustrative of certain practical embodiments of the invention, and not as limitations thereon except as required by the spirit and scope of the appended claims.

Having thus described the invention, I claim:

1. A drive belt comprising a flat endless band of resilient material adapted to extend about rotatable members on which the belt is trained, said endless band on its inner surface being provided with integral equally longitudinally spaced pin-like projections of truncated conical configuration extending transversely relative to the thickness of the band and having a maximum diameter substantially less than the width of the band and constituting driving surfaces and adapted to cooperate with correspondingly spaced and shaped openings in the circumference of a rotatable member for effecting driving relationship between said member and said band without slippage, said endless band at its opposite longitudinal edges having continuous outwardly extending flanges on the outer surface of the band of thin width relative to the width of the band and spaced apart substantially the width of the band, and a discrete endless flexible metallic member separable from said band and positioned on the outer surface thereof to extend entirely therearound between and in contact with said flanges and in contact with the outer surface of the band over substantially the entire width of the band, whereby the belt may be readily placed in cooperation with rotatable members mounted on axes fixedly spaced apart while changes in spacing between said driving surfaces are prevented as they move into and out of driving relationship with the complementary surfaces on the associated rotatable members.

2. A belt drive comprising a pulley member and a belt member trained thereabout the said belt member including an endless flat band of resilient material provided on its inner surface with a longitudinal series of equally spaced pin-like projections of truncated conical configuration and having a maximum diameter substantially less than the width of the band, said pulley member being provided on its circumference with a circumferential series of recesses spaced apart with the same spacing as said pin-like projections and complementary in configuration to said projections, said projections and said recesses forming interengaging driving surfaces between said belt member and said pulley member to effect a driving relationship therebetween without slippage, said band at its opposite longitudinal edges and on its outer side having longitudinally extending outwardly projecting flanges of thin width relative to the width of the band and spaced apart substantially the width of the band, and a discrete endless nonextensible metallic member separable from said band and positioned thereon to extend completely therearound between and in contact with said flanges and in contact with the outer surface of the band over substantially the entire width of the band.

References Cited in the file of this patent

UNITED STATES PATENTS

| 385,682 | Page | July 3, 1888 |
| 1,792,921 | Newhouse | Feb. 17, 1921 |
| 2,397,312 | Forrest | Mar. 26, 1946 |
| 2,507,852 | Case | May 16, 1950 |
| 2,534,679 | Place | Dec. 19, 1950 |

FOREIGN PATENTS

| 995,377 | France | Aug. 14, 1951 |